United States Patent [19]

Zulauf

[11] Patent Number: 4,487,456
[45] Date of Patent: Dec. 11, 1984

[54] WHEEL DISC CAST IN SITU WITH INTERLOCKING RIM

[75] Inventor: Herbert Zulauf, Feuerthalen, Switzerland

[73] Assignee: Swiss Aluminium Ltd., Chippis, Switzerland

[21] Appl. No.: 442,260

[22] Filed: Nov. 17, 1982

Related U.S. Application Data

[62] Division of Ser. No. 224,472, Jan. 12, 1981.

[30] Foreign Application Priority Data

Jan. 30, 1980 [CH] Switzerland ............................ 761/80

[51] Int. Cl.³ ............................ B60B 3/02; B60B 3/06
[52] U.S. Cl. .................................... 301/63 R; 301/65; 301/67; 301/96
[58] Field of Search ............ 301/55, 58, 63 R, 63 DT, 301/63 PW, 65, 64 R, 64 SH, 66, 67, 73, 79, 95, 96, 97; 295/21, 23, 27, 28, 29

[56] References Cited

U.S. PATENT DOCUMENTS

| | | | |
|---|---|---|---|
| 158,848 | 1/1875 | Leland | 295/8 |
| 950,500 | 3/1910 | Woods | 295/8 |
| 950,501 | 3/1910 | Woods | 295/8 |
| 3,859,704 | 1/1975 | Nassou | 301/63 R X |

Primary Examiner—David A. Scherbel
Attorney, Agent, or Firm—Bachman and LaPointe

[57] ABSTRACT

A device for manufacturing vehicle wheels having a rim which is wreath-shaped in cross section surrounding a cast wheel body is such that at least one die wall delimits the mold to be filled with cast metal. The prefabricated rim is laid between facing surfaces of a die plate and a center plate with the result that the die faces and the rim form the outer contours of the wheel body when the mold space between the die faces and rim is filled with molten metal which is introduced into the mold space under pressure. The rim itself is held by a clamping ring and can be removed in two pieces from the die assembly. A device for spraying a cooling medium onto the rim is provided on or in the clamping ring. The rim features on its inner face a central strut which is T-shaped in cross section, and on both sides of the actual struts are side struts which are inclined outwards. The free ends of the side struts are displaced by the surface of the die plates.

1 Claim, 5 Drawing Figures

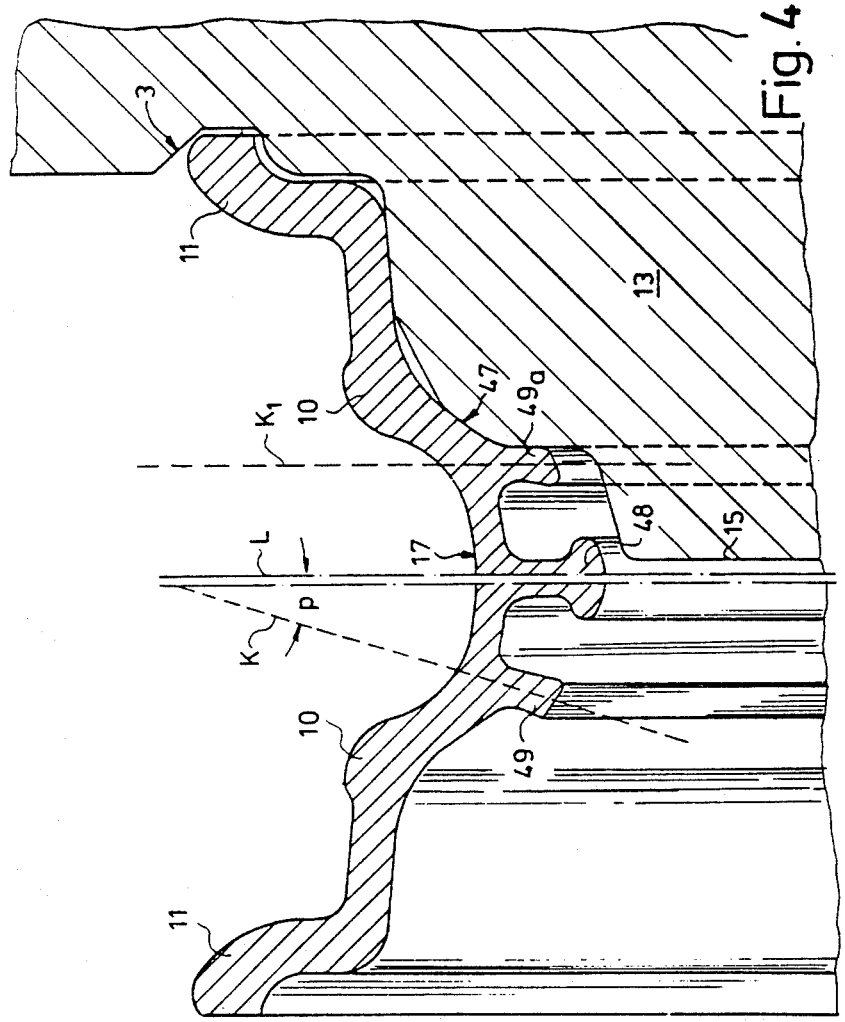

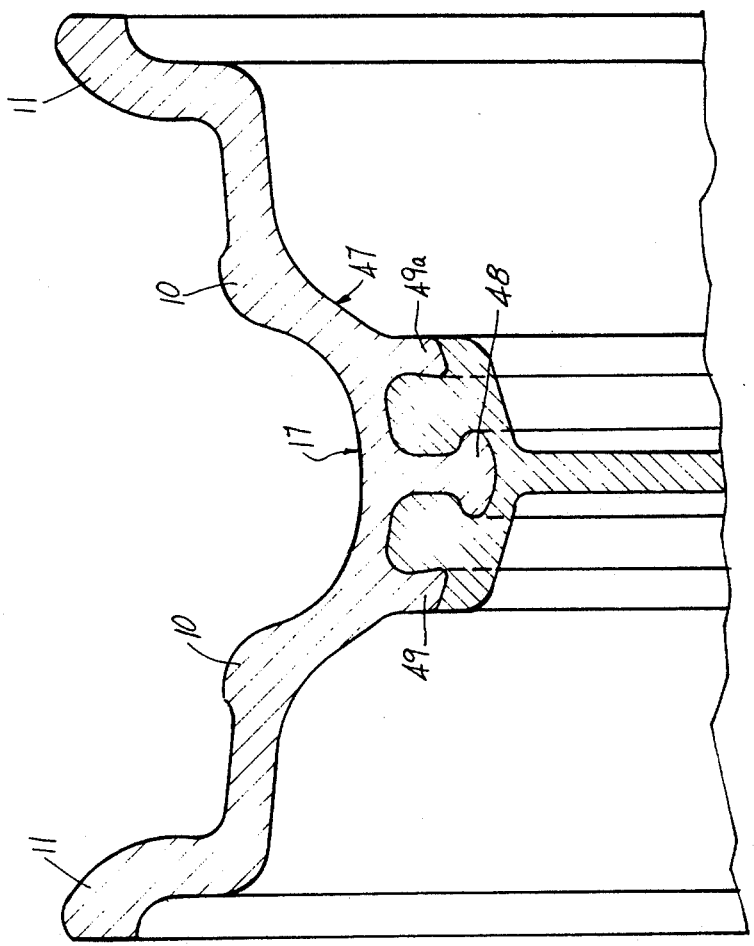

WHEEL DISC CAST IN SITU WITH INTERLOCKING RIM

This is a division of application Ser. No. 224,472, filed Jan. 12, 1981.

BACKGROUND OF THE INVENTION

The present invention relates to a device and process for manufacturing wheels for vehicles having a rim which is wreath-shaped in section around a cast wheel body, for example a central disc or dish-shaped body, with at least one mold wall delimiting the space to be filled with cast metal.

As wheels, axles and related support facilities are unsprung components in the vehicle, it is important both for safety and comfort when driving, that not only the material but also the connection between the rim and wheel is optimized.

One-piece cast wheels are known. However, because of the high costs for the mold, these wheels are very expensive to manufacture and furthermore exhibit a low degree of toughness. Also, high reject rates have to be accepted when making this kind of wheel.

For the foregoing reasons wheel rims and bodies are generally made separately and then joined. Known methods of joining rim and body are for example bolting, rivetting, welding or gluing. In many cases these methods do not provide the high level of mechanical properties expected of vehicle wheels and do not produce the dimensional accuracy and close fit needed for wheels for tubeless tires.

Diffusion layers are also used to join the rim to the wheel body. However, there is the risk of peeling off due to stresses which arise from shrinkage which stresses cannot be avoided completely. The relatively high cost involved in joining the parts is another disadvantage. Furthermore, with the moveable mold parts used for the rim well in present day foundry practice, there is the danger that these parts will lose their roundness when heated.

The present state of the art is the use of vehicle wheels made purely from semi-fabricated products. However this markedly limits the design possibilities.

It is therefore the principal object of the invention to develop a device and process, whereby the foregoing disadvantages are completely or at least partly avoided and more particularly a device and process by means of which a good junction between wheel body and rim is achieved with a faultless structure, and at the same time achieving a simplification in the die, an increase in production rate and a reduction in die costs.

SUMMARY OF THE INVENTION

The foregoing objects are achieved by way of the present invention wherein an intermediate or center plate faces a die plate, between which the rim is positioned and the facing surfaces of which together with the rim are parts of the mold for the wheel body, and a further die plate in the die assembly features facilities for introducing the molten metal, and at least one clamping ring is provided around the rim.

The rim is manufactured preferably by roll forming, deep drawing, pressing or extruding and is made, for example, of steel, magnesium or aluminum.

One of the advantages of the device of the present invention is that the rim acts as a part of the mold for the wheel body. This means that the moveable mold part for the rim well, which is needed in conventional casting methods, is omitted by way of the present invention. The elimination of this mold part simplifies the die assembly considerably with the result that the production rate can be increased while die costs are reduced. Furthermore, the risk that the wheel will not be round, due to deformation of the sleeve, is also eliminated.

A clamping ring, which surrounds and holds the rim, simplifies the die arrangement and the handling. This ring has preferably two layers and between these a device for spraying a cooling medium. The coolant is sprayed onto the rim, runs off this and collects in a trough. For simplicity water is used for the cooling medium.

The device according to the present invention not only promotes directional solidification of the cast metal but also enables a perfect dendritic structure to be achieved in the region of the joint. Furthermore, there is the possibility of inserting a heat-treated rim without it softening due to annealing during casting. This also enables higher fatigue strengths to be achieved.

The clamping ring itself is preferably made up of two half-rings, and can be removed from the mold assembly. This makes the removal of the wheel and insertion of the next rim easier. To this end at least one half-ring can be pivoted on a hinged joint and can thus be removed from the other half-ring.

Both half-rings are provided at one end with arms, which are preferably joined by a swivel hinge, and at the other end with shoulder pieces. Both the shoulder pieces and the arms feature recesses or surfaces which run wedge-shaped towards each other and, in conjunction with clamping facilities on the intermediate plate which effects the closure of the two half-rings. The clamping facility comprises for simplicity a U-shaped fork which grips over the two shoulder pieces or arms and due to its wedge-shaped surface or recess effects a clamping action.

A positioning rod is attached to the arms. The rod fits into an alignment sleeve and is moved parallel to the central axis of the clamping ring by means of a drive mechanism. The foregoing enables the rim and the clamping ring to be drawn out of the mold assembly.

In order to prevent tilting of the die parts on withdrawal of these, for example an additional arm is provided on the clamping ring in the form of a flange onto which a positioning rod is attached.

The rim itself is provided with a plurality approximately radially inclined projections on its inner face. These are preferably in the form of a T-shaped middle strut and a pair of side struts located on both sides of the middle strut. The side struts form a clamp together with the part of the rim between them, and are such that, before the actual process for manufacturing the wheel body begins, the middle axes of these side struts form an acute angle with the middle axis of the middle strut. Before introducing the molten metal into the cavities between the side struts and the middle strut, the pressure from the die plate onto the center plate is increased. This causes the free ends of the side struts to bend, resulting in a good seal. In the end position the middle axes of the side struts run approximately parallel to the middle axis of the middle strut. Consequently the cavity between the side strut and the middle strut becomes an undercut groove, which contributes greatly to an intimate connection between rim and wheel body. A further basic advantage of this design is that a uniform seal is achieved in the region where the parts join. At the place where the parts join a perfect structure without cavities is achieved.

Furthermore, the invention provides for, if necessary or desired, the die faces to be on an insert which can be exchanged and is situated in the preferably moveable die plate or center plate. This means that when wear occurs they can be removed easily and replaced by new inserts. This guarantees production of vehicle wheels which are dimensionally more accurate, and this with no great effort or investment.

To introduce the molten metal, a feed pipe containing this metal is provided, preferably off-center on the second, usually immoveable die-plate and a clamping plate next to this plate. The molten metal is forced by a piston, preferably under high pressure, through an opening into a space for the metal sprue and through a conical feed channel in the center plate into the mold space between the die surfaces and the rim.

A mandrel is provided to produce the wheel hub.

At the other end of the device away from the clamping plate is another clamping plate. If necessary or desired, ejector pins are provided between this latter clamping plate and the moveable die plate on an ejector plate. These ejector pins enable the rim and wheel body to be freed from the die plate.

To manufacture wheels of the above mentioned kind, the rim is pre-fabricated and laid between facing surfaces of a die plate and center plate such that the die faces and the rim contour produce the wheel body when the molten metal is forced under pressure into the mold space formed by the die faces and the rim.

The rim is introduced by means of the clamping ring which is removed from the die between the mandrel and alignment bolts on a clamping plate. One of the half-rings of the clamping ring is swung out, the rim inserted, the clamping ring closed again and moved back into the die. Next, the moveable die plate is moved towards the center plate so that the alignment bolts engage in the recesses in the die plate. The rim is centered by the facing surfaces of the die plate and the center plate.

As soon as all three plates of the die are lying together, the pressure on the moveable die is increased and, at the same time, molten metal forced by the piston at high pressure out of the feed pipe through the cavity and conical feed channel into the mold space formed by the die faces and the rim.

As a result of the pressure from the moveable die plate on the center plate, the side struts which are already prestressed are bent so that their middle axes run approximately parallel to the middle strut.

Due to the T-shaped contour of the middle strut an undercut groove is produced, which effects a very good connection between wheel body and rim.

At the same time the rim is sprayed with a coolant which, besides other benefits, results in rapid cooling of the wheel body.

After this, the moveable die plate is drawn back again, the clamping ring withdrawn together with the finished wheel out of the mold between the mandrel and the alignment bolts opened and the wheel removed.

BRIEF DESCRIPTION OF THE DRAWINGS

Further advantages, features and details of the present invention are revealed in the following description of preferred exemplified embodiments and with the help of the accompanying drawings wherein

FIG. 3: An enlarged cross section through a rim before the cast metal is fed to it.

FIG. 4: An enlarged cross section through a rim and a part of a die insert, after manufacturing a wheel body.

FIG. 5: An enlarged cross section through a rim after casting of the cast wheel body.

DETAILED DESCRIPTION

Figure 1:
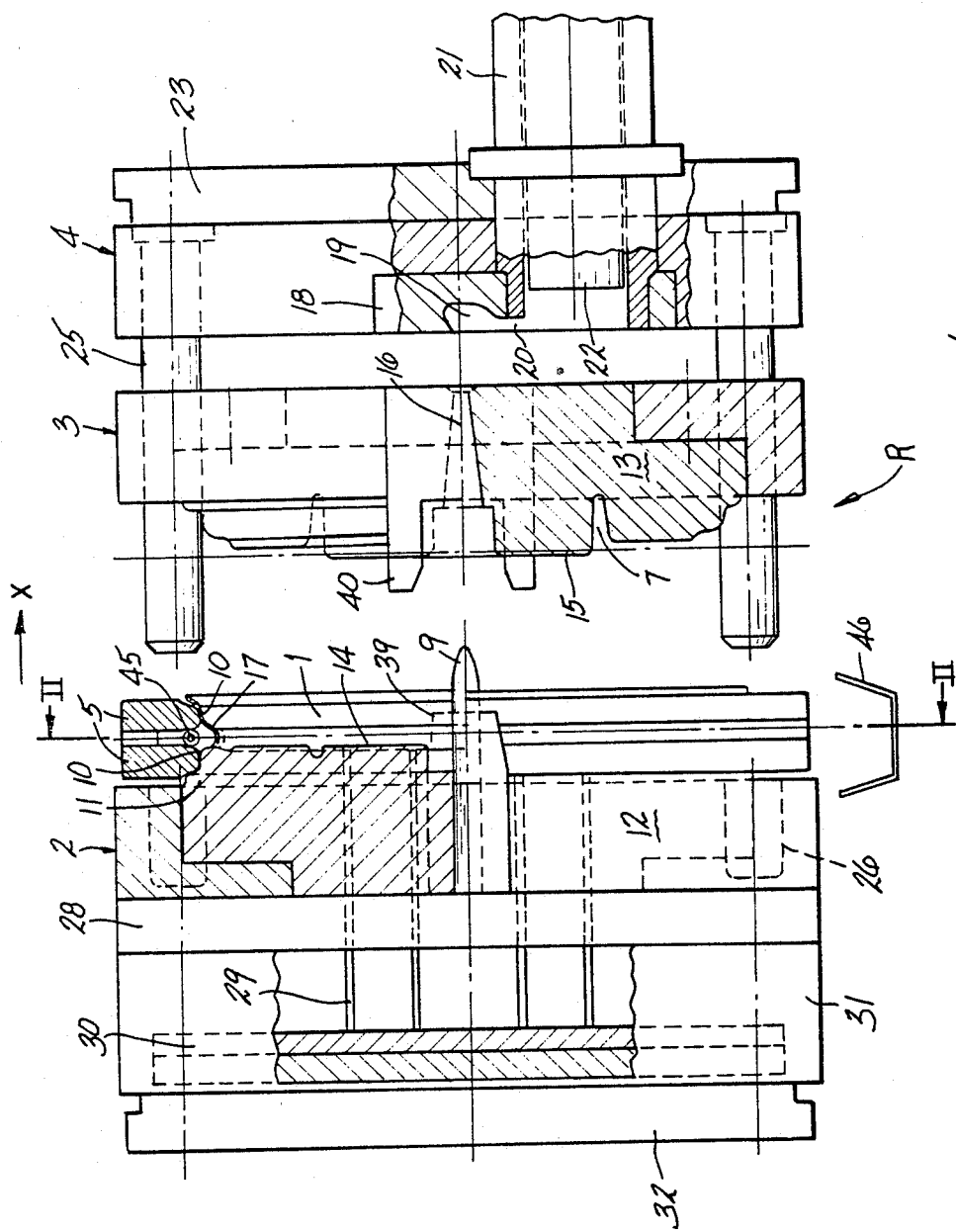
FIG. 1: A partly sectioned end view of a device for manufacturing wheels for vehicles.

A device R for manufacturing vehicle wheels is shown in FIG. 1 and is such that one of the circular surfaces of a rim 1 lies against a moveable die plate 2 onto which an intermediate or center plate 3 and a stationary die plate 4 are fitted and jointly form a mold.

The rim 1 is held in the desired position by means of a two-piece clamping ring 5. This lies close against the rim 1 between rim shoulder 10 and flange 11. Both shoulders 10 delimit a wheel bed or well 17.

Plates 2 and 3 feature parts 12 and 13 respectively, the outer surfaces 14 and 15 of which correspond to the outer contour and surface of a wheel body 6 (FIG. 2) and the inner contour of the rim 1. Thus, the blind holes 7 form a part, not shown here, which surrounds the brake, drum. A hub 8 is indicated by a mandrel 9 penetrating the part 12.

The center plate 3 is penetrated at the center by a conical metal-feed channel 16 which becomes narrower towards die plate 4.

Connecting up to the opening at the end of the conical channel 16 on the side of the die part 4 is a space 19 in an insert 18 in plate 4 for a part where the metal feed is broken off from the casting. This connects up via an opening 20 with a filling sleeve 21 which is positioned off-center in the mold plate 4 and in which a pressure piston 22 operates. Sleeve 21 and piston 22 penetrate, likewise off-center, a clamping plate 23 which delimits one side of the die.

The clamping plate 23 carries four alignment bolts 25 onto which the die plate 4 and center plate 3 are pushed. The same bolts 25 can be introduced into corresponding alignment holes 26 in die plate 2 (indicated in FIG. 1 by broken lines).

An intermediate plate 28 lies against the back face of die plate 2 that is on the side away from the mold face 14.

Ejector pins 29 attached to an ejector plate 30 penetrate both die plate 2 and intermediate plate 28 and can be moved in a space 31.

The other side of space 31 is delimited by a clamping plate 32.

Figure 2:
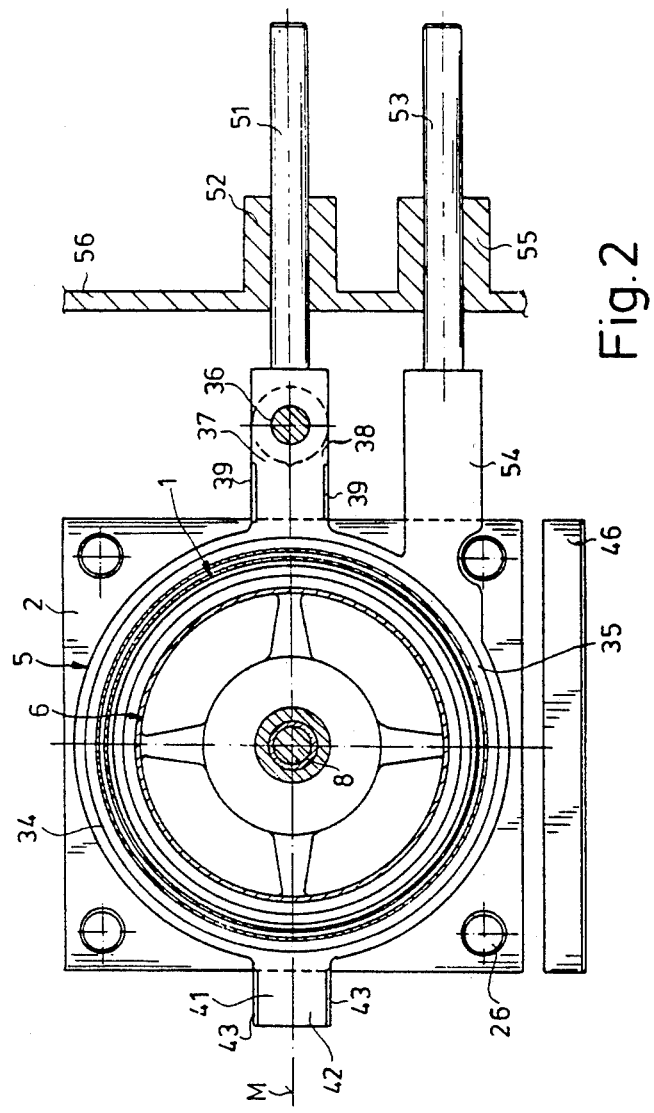
FIG. 2: A cross section along line II—II in FIG. 1.

As shown in FIG. 2, the clamping ring 5 is divided along a middle axis M into two half-rings 34 and 35 such that an arm 37 projects out from the half-ring 34 at one ned. The arm 37 is connected to a hinged joint 36 around which it can be rotated.

An arm 38 projects out from half-ring 35, corresponding to arm 37 on half-ring 34. A part of the arms 37 and 38 feature tapered regions 39 (FIG. 1) onto which a clamping device 40 is pushed when the die is closed, thus pressing both half-rings 34 and 35 together.

Projecting out from the half-rings 34 and 35 at the other end from the arms 37 and 38 are shoulder pieces 41 and 42 which likewise taper together in a wedge shape over a region 43. On closing the die the shoulders 41 and 42 are likewise pressed together by a clamping device.

The joint 36 is connected to a rod 51 which can be moved in a bearing 52 on a supporting plate 56. The clamping ring 5 can be moved parallel to the central axis M via this rod 51 by means of a driving mechanism, which is not shown here.

To prevent the clamping ring 5 from tilting out of line, a bar 54 projects out from the half-ring 35. Connected to bar 54 is another alignment rod 53 which is moveable in a bearing 55 on the supporting plate 56.

A device 45 for spraying a cooling medium onto the rim well 17 is provided between clamping ring 5 and rim well 17. The coolant running off the ring is caught and collected in a trough 46.

As shown in FIG. 3, rim 1 features on its inner side 47 projections in the form of a T-shaped middle strut 48 and a pair of side struts 49 on either side of strut 48.

Side strut 49 has a central axis K which, before the rim 1 is placed in the die R, forms an acute angle p with the middle axis L of the middle strut 48, which at the same time is the axis of symmetry of the rim 1.

During the production of the composite wheel the free end of the side strut 49 is pressed in the direction of the middle strut 48 by surface 15 (FIG. 4) of insert 13 of the center plate 3 until the central axis $K_1$ is approximately parallel to the middle axis L. The resultant, displaced side strut is denoted by 49a.

At the start of the production sequence the clamping ring 5 is withdrawn from the die by the power driven rods 51 and 53. The clamping ring 5 is opened by raising the half-ring 34, the rim 1, which is preferably made of steel, magnesium or aluminum by roll forming, deep drawing, die casting or extrusion, is laid on the half-ring 35 and fixed in place by closing the half-ring 34.

The clamping ring 5 with rim 1 is then returned to the die between mandrel 9 and alignment bolts 25.

The moveable die plate 2 is then moved up to the rim 1, as a result of which die face 14 centers the rim 1.

The die plate 2 pushes the rim 1 together with clamping ring 5 in the direction x up to the center plate 3. On doing so the alignment bolts 25 enter alignment holes 26, and the clamping device 40 wedges the arms 37 and 38 and shoulders 41 and 42 together. In this position the center plate 3 and die plate 4 also lie close together.

At the same time the pressure on the moveable die plate 2 is increased. This causes the side struts 49 to be brought into their position 49a.

The charge of molten metal in sleeve 21 is then pushed by piston 22 through the opening 20 into space 19 and from there through the conical feed channel 16 into the mold space formed by the die faces 14 and 15 and the inserts 13 and 12. At the same time a coolant is sprayed onto the rim 1 by the spraying device 45.

The die plate 2 is then drawn back together with the so manufactured wheel and the clamping ring 5. The ejector pins 29 push the wheel body from die plate 2 far enough that it can be pushed out of the die assembly between the mandrel 9 and alignment bolts 25. The clamping ring 5 is opened and the wheel removed.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A wheel comprising a circular rim portion, said circular rim portion having an outer surface provided with a wheel well and an inner surface provided with a plurality of projections, said plurality of projections comprising a middle T-shaped strut flanked on either side thereof by side struts wherein said side struts define with said middle T-shaped strut a plurality of undercut grooves for receiving a portion of a cast wheel body cast to said plurality of projections on said circular rim portion in situ such that said cast wheel body is secured to said circular rim portion by means of said cast wheel body being joined to said plurality of projections.

* * * * *